(12) United States Patent
Kitai

(10) Patent No.: US 8,723,779 B2
(45) Date of Patent: May 13, 2014

(54) TILED OPTICAL FIBER DISPLAY

(75) Inventor: Adrian Kitai, Mississauga (CA)

(73) Assignee: McMaster University, Hamilton, ON (CA)

( * ) Notice: Subject to any disclaimer, the term of this patent is extended or adjusted under 35 U.S.C. 154(b) by 1520 days.

(21) Appl. No.: 10/587,334

(22) PCT Filed: Jan. 18, 2005

(86) PCT No.: PCT/CA2005/000050
§ 371 (c)(1),
(2), (4) Date: Jun. 4, 2007

(87) PCT Pub. No.: WO2005/071471
PCT Pub. Date: Aug. 4, 2005

(65) Prior Publication Data
US 2007/0279367 A1 Dec. 6, 2007

Related U.S. Application Data

(60) Provisional application No. 60/538,501, filed on Jan. 26, 2004.

(51) Int. Cl.
*G09G 3/36* (2006.01)

(52) U.S. Cl.
USPC ............................................. 345/102; 349/62

(58) Field of Classification Search
None
See application file for complete search history.

(56) References Cited

U.S. PATENT DOCUMENTS

| | | | | |
|---|---|---|---|---|
| 4,417,412 A | * | 11/1983 | Sansom | 40/547 |
| 5,053,765 A | * | 10/1991 | Sonehara et al. | 340/815.43 |
| 5,164,715 A | | 11/1992 | Kashiwabara | |
| 5,293,437 A | * | 3/1994 | Nixon | 385/115 |
| 5,301,090 A | * | 4/1994 | Hed | 362/558 |
| 5,661,531 A | | 8/1997 | Greene | |
| 5,808,800 A | | 9/1998 | Handschy | |
| 6,011,545 A | * | 1/2000 | Henderson et al. | 345/173 |
| 6,224,216 B1 | * | 5/2001 | Parker et al. | 353/31 |
| 6,252,563 B1 | * | 6/2001 | Tada et al. | 345/1.1 |
| 6,369,867 B1 | | 4/2002 | Ge | |
| 2002/0051103 A1 | * | 5/2002 | Faris et al. | 349/65 |
| 2002/0067444 A1 | * | 6/2002 | Paolini et al. | 349/65 |
| 2002/0070914 A1 | * | 6/2002 | Bruning et al. | 345/102 |
| 2002/0080302 A1 | * | 6/2002 | Dubin et al. | 349/73 |
| 2002/0097967 A1 | * | 7/2002 | Lowry | 385/115 |
| 2002/0172039 A1 | * | 11/2002 | Inditsky | 362/231 |
| 2003/0178627 A1 | * | 9/2003 | Marchl et al. | 257/80 |
| 2005/0134527 A1 | * | 6/2005 | Ouderkirk et al. | 345/32 |

FOREIGN PATENT DOCUMENTS

| WO | WO 02 075440 A1 | | 9/2002 |
|---|---|---|---|
| WO | WO03/077013 | * | 9/2003 |

* cited by examiner

*Primary Examiner* — Amare Mengistu
*Assistant Examiner* — Antonio Xavier
(74) *Attorney, Agent, or Firm* — Lynn C. Schumacher; Hill & Schumacher

(57) ABSTRACT

The present invention provides a tiled optical fiber display device structure which includes a light emitting diode (LED) backlit liquid crystal display (LCD). Light from the LCD enters an array of optical fibers that directs the light to a viewing screen. The optical fibers eliminate the use of energy absorbing color filters in conventional LCD's, and also enable the seamless tiling of multiple display modules.

3 Claims, 5 Drawing Sheets

TILED OPTICAL FIBER DISPLAY

CROSS REFERENCE TO RELATED U.S. APPLICATION

This patent application relates to, and is a National Phase application claiming the benefit of PCT/CA2005/000050 filed on Jan. 18, 2005; which further claims the priority benefit from, U.S. Provisional Patent Application Ser. No. 60/538,501 filed on Jan. 26, 2004, which is incorporated herein by reference in its entirety.

FIELD OF THE INVENTION

The present invention relates to a tiled optical fiber display.

BACKGROUND OF THE INVENTION

Liquid crystal (LC), light emitting diode (LED) and plastic optical fibre (POF) technologies are combined in a unique way to form full colour displays. Remarkable progress in LED technology has recently enabled high efficiency red, green and blue light sources with lifetimes of 100,000 hours. These are in current use for very large outdoor video displays (diagonal size of 20 ft, for example) with pixel spacings >2 cm, where the high cost of assembling from ~100,000 to ~1,000,000 LEDs is warranted. (Cost from $50,000 to $1,000,000 or more.)

In many applications, this is not affordable, particularly where a large number of pixels is desired. One approach is to use a bright white light source and then to use a LCD (liquid crystal display) light modulator to control the brightness of each pixel. This approach has a lower cost structure and has been demonstrated:

The publication "Case Study: Building the Market for a Tiled-Display Solution", Needham, B., Information Display 10, pages 20-24, 2003, discloses an optical fiber-based display technology and application in public information displays and advertising.

A major issue with this approach is the loss of light associated with the LCD device. Typically only 5% of the light is used, and the remaining 95% is absorbed by components of the LCD.

Another issue is the strict requirement for exact alignment of the LCD units where an array of LCD units is tiled together to produce the desired display size. This generally requires that the image size of each LCD unit be expanded, allowing seamless tiling of the LCD units.

The publication "Psychophysical Requirements for Seamless Tiled Large-Screen Displays" Alphonse G A; Lubin J., Society for Information Display (SID) Digest, 49.1, pages 941-944, 1992, discusses the optical requirements of a tiled display system to achieve a seamless appearance to the human observer. The publication entitled "Optical Tiled AMLCD for Very Large Display Applications", Abileah A; Yaniv Z, Society for Information Display (SID) Digest, 49.2, pages 945-949, 1992, describes an optical fiber module that may be used to enlarge the image size of a LC display enabling a tiled display.

The largest single light absorbing component of the LCD device is the colour filter array, used to separate the white light source into colour components. Typically, about 75% of the white light is absorbed by colour filters.

Other related references of general relevance include:

WO/03/067318 discloses a Tiled Display with Filter for Uniform Pixel Brightness which comprises an image display device having an array of electrically driven picture elements which are viewable at a viewing surface. Luminance corrections are arranged with respect to the image display device so as to apply a spatial luminance filter to the output of the image display device, the spatial luminance filter attenuating the light output by each picture element of the image display device in substantially inverse relation to the luminance response characteristics of the picture element so that each picture element exhibits substantially the same luminance for a given input electrical driving signal.

WO/03/067563 discloses a Display with Optical Fibre Face Plate which comprises an array of pixel elements; and an image guide having an array of light transmission guides, input ends of the light transmission guides being arranged to receive light from pixel elements of the image display device. Output ends of the light transmission guides provide an image output surface. Each light transmission guide includes a light-guiding region to promote light propagation by total internal reflection and a reflective coating on the light guiding region to promote specular reflection at the region-coating interface.

Therefore, it would be very advantageous to provide a tiled optical fiber display device structure in which the image size of a LCD display is expanded, enabling any desired number of LCD displays to be tiled together without gaps between them, so as to create a seamless picture, with superior display brightness and colour quality achieved due to backlighting with LED lamps and eliminating the need for light absorbing colour filters.

SUMMARY OF THE INVENTION

The present invention provides a tiled optical fiber display device structure which includes a light emitting diode (LED) backlit liquid crystal display (LCD). Light from the LCD enters an array of optical fibers that directs the light to a viewing screen. The optical fibers are arranged so as to eliminate the use of energy absorbing colour filters in conventional LCD's, and also to enable the seamless tiling of display modules.

The present invention provides a tiled optical display, comprising:

at least one display module including i) a single liquid crystal display modulator and at least three light emitting diodes positioned to backlight the liquid crystal display modulator, the at least three light emitting diodes including one each of red, green and blue light emitting diodes with a beam of light from each light emitting diode being focused onto a separate one of at least three pre-selected regions of the liquid crystal display modulator spaced from the light emitted by the other light emitting diodes, each pre-selected region of the liquid crystal display modulator including a set of optical modulation elements such that light from each beam of light passes through one set of corresponding optical modulation elements, including control means connected to each individual modulation element of each set of optical modulation elements for controlling a desired amount of light from each beam to pass through each individual optical modulation element of the liquid crystal modulator; and ii) a planar view plane having a pre-selected number of pixels, wherein each pixel is optically coupled to a modulation element in each of said at least three pre-selected regions, each optical fiber having a first end optically coupled to its associated modulation element and a second end optically coupled to its associated pixel, and wherein said first ends of each optical fiber are arranged symmetrically with respect to the beam of light focused onto each pre-selected region of the liquid crystal display modulator so the first ends of said optical fibers in a given pre-selected region of the liquid crystal display modulator is illuminated with substantially the same intensity from the light emitting diode illuminating said given pre-selected region.

BRIEF DESCRIPTION OF THE DRAWINGS

The invention will now be described, by way of example only, reference being had to the accompanying drawings, in which.

DETAILED DESCRIPTION OF THE INVENTION

Figure 1:
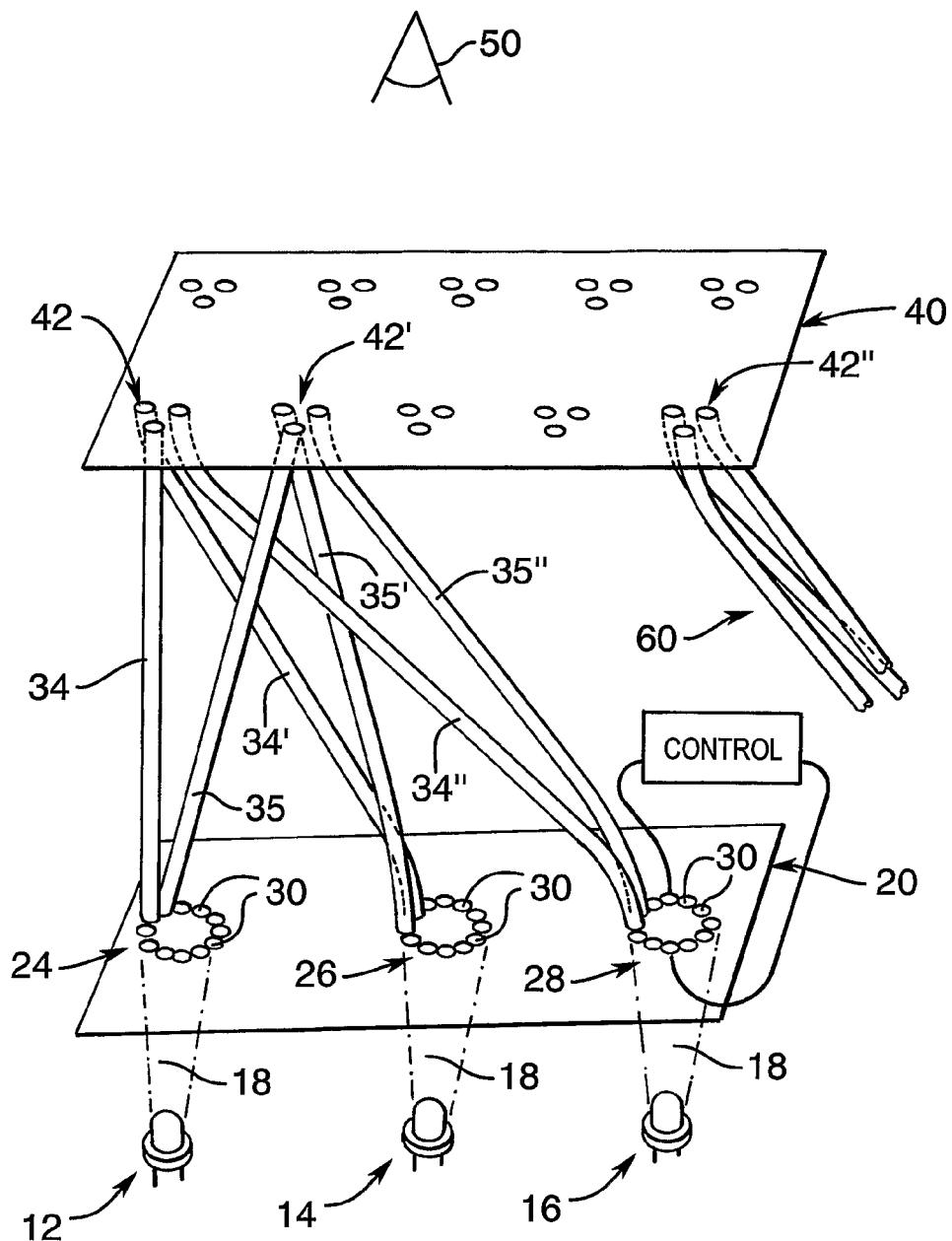
FIG. 1 is schematic diagram of a tiled optical fiber display produced in accordance with the present invention.

The structure and operation of the display will now be described with reference to FIG. 1, which shows an example of a display 10 constructed in accordance with the present invention. A red, a green and a blue-emitting light emitting diode (LED) at 12, 14 and 16 respectively are supplied with a steady direct electric current (DC) to provide steady illumination. Focused LED's are preferred from which a light beam is emitted in a cone 18 of a particular colour from each LED with a typical divergence angle of ~15°. Light from each LED 12, 14, and 16 illuminates only a desired portion 24, 26 and 28 respectively of a liquid crystal display (LCD) modulator 20 so that light of only one colour from only one LED illuminates each associated portion of LCD modulator 20. The LCD modulator 20 is comprised of both polarizers and polarization-rotating LC material capable of allowing varying amounts of light to pass through the LCD modulator 20 from substantially no light to a significant amount of light according to control voltages applied to the LCD modulator 20.

These beamlets of light pass through a two dimensional array of modulator elements 30, with a corresponding set of optical modulation elements 30 situated to coincide with the intensely illuminated regions 24, 26 and 28 within LCD modulator 20 such that light from each beamlet passes through one corresponding modulation element 30 and then exits from the LCD modulator 20 and enters an optical fiber element 34. Each modulator element may be individually controlled to allow a desired amount of light from each beamlet to pass through the LCD modulator. One optical fiber element 34 is situated in front of each LCD modulation element 30 such that it may collect one beamlet of light. The optical fiber elements 34 guide the light from the individual optical fibers and terminate at a flat viewing plane 40. Three fiber elements 34, 34' and 34" carrying light from one blue, one green and one red beamlet, respectively, are grouped together at plane 40 to form one pixel shown at 42. Another pixel shown at 42' is formed from fiber elements 35, 35' and 35". In the example of FIG. 1, there are other pixels and optical fiber elements (e.g. fibers 60 and pixel 42") that are not fully shown, however, each pixel is formed from three optical fibers that are unique to the particular pixel, such that the three optical fibers are illuminated with red, green and blue light, respectively, obtained from corresponding LCD modulator elements with the three LCD modulation elements being illuminated with light from the red-, green- and blue-emitting LED's, respectively.

The viewer at 50 observes the light exiting from the pixels 42, 42' and so on which are formed by the ends of the optical fiber elements 34, 34' and so on located at plane 40, and the viewer sees a pattern of light and dark pixels, depending upon the state of each modulator element 30 of modulator 20. Control of LCD modulator elements 30, forms the desired displayed information in colour. Note that only three LED's have been necessary in total to illuminate a number of pixels, in the example of FIG. 1, twelve (12) pixels.

Yet more pixels may be provided as indicated in FIG. 1 on viewing plane 40 by additional optical fibers 60 which are lit by beamlets from other optical modulators, and other red, green and blue LED's. In this manner, as many pixels as desired may be formed on viewing plane 40, provided that a suitable number of LCD modulators, LED's, and optical fibers are provided. An arbitrary number of units may therefore be tiled together from a number of LCD modulators and LED's to create as many pixels as desired.

Figure 2:
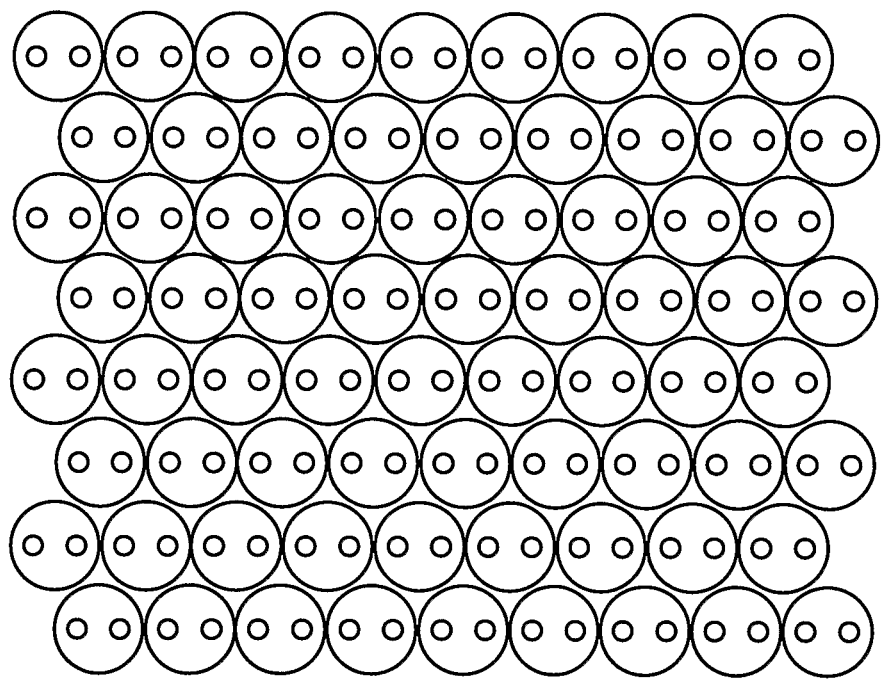
FIG. 2 is a LED placement diagram, showing layout of 72 LEDs each having two leads (all dimensions in mm), each LED only emits light having one of three possible colours, namely red, green or blue, each triangle formed by three neighbouring LEDs is comprised of a red, a green and a blue-emitting LED.

A display module has been constructed comprising seventy-two (72) LEDs (24 red, 24 green, 24 blue) arranged as shown in FIG. 2 to illuminate an active matrix LCD modulator that contains no colour filters obtained from Sharp. Although only one modulator element for each fiber is necessary, this LCD has many closely spaced light modulation elements, such that each modulator element 30 in display module 10 actually consists of a group of light modulator elements within the Sharp LCD modulator.

Each cluster of three neighbouring LEDs in a triangular configuration includes one LED of each of the three colours. The LEDs have a 15 degree divergence of light.

Figure 3:
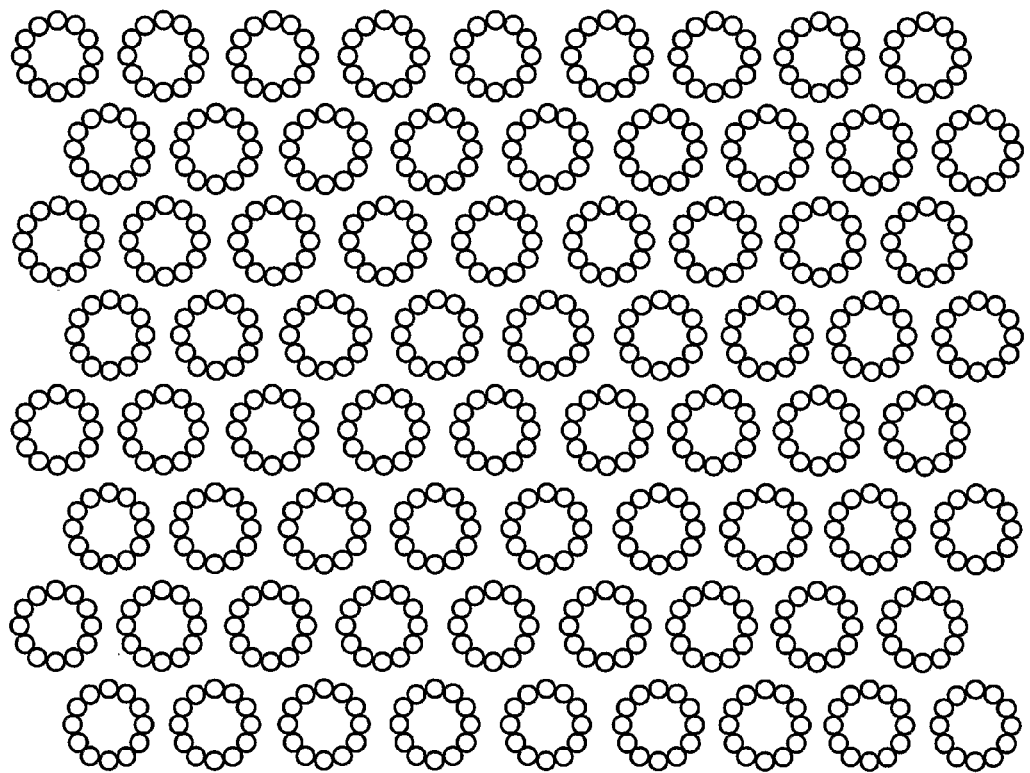
FIG. 3 shows hole locations in a first optical fiber retaining plate through which the optical fibers are inserted.

The LCD is placed directly up against the LEDs and therefore light of one colour from a given LED does not mix with light from neighbouring LEDs, but passes through the LCD and enters a first end of twelve (12) optical fibers that are arranged in a group in a circular pattern to efficiently utilize the light given off by the LED. Since each of the twelve (12) optical fibers is arranged in a symmetrical manner relative to the LED, it is illuminated with substantially the same intensity as the other eleven (11) fibers which access light from the same pre-selected region of the LCD 20. The arrangement of the optical fibers where light enters them at the first end is shown in FIG. 3.

Figure 4:
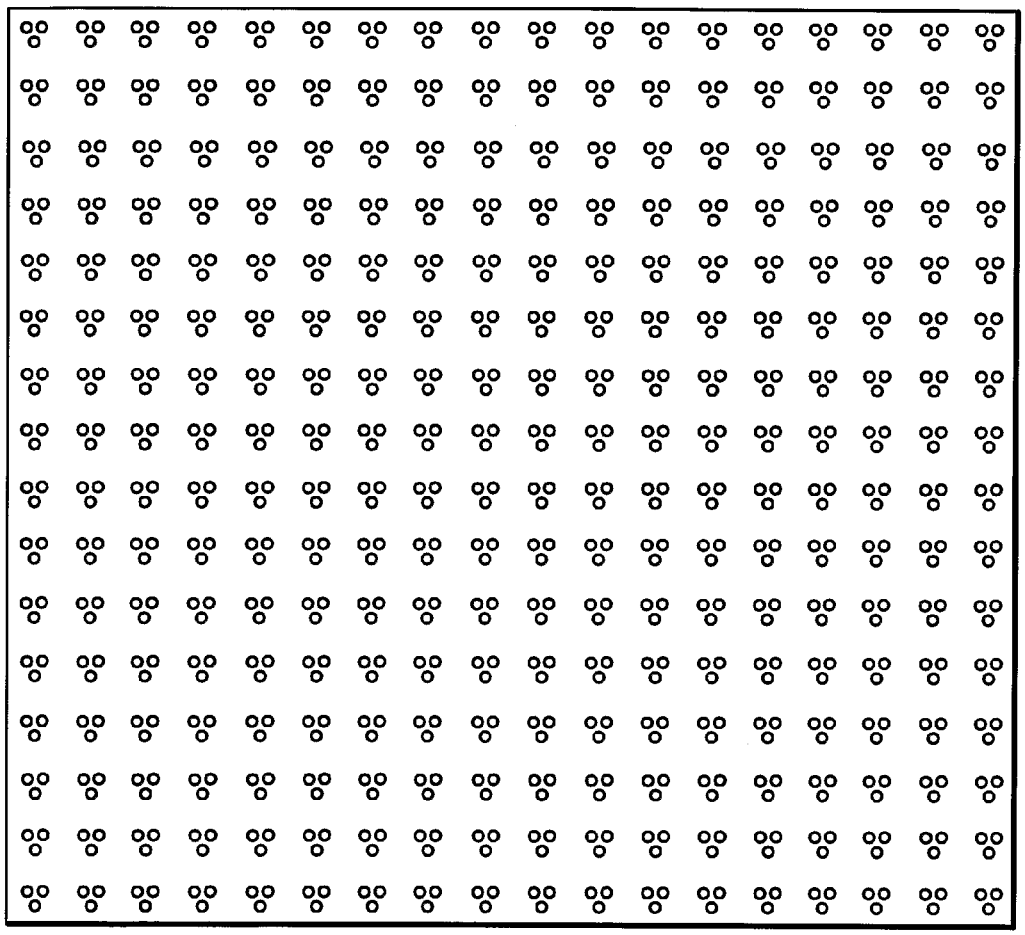
FIG. 4 shows hole locations in a second optical fiber retaining plate through which the optical fibers are inserted.

Each optical fiber now extends away from the LCD 20 and being bendable, is routed to a series of locations from which light emerges from the second end as shown in FIG. 4. Note that each fiber shown in FIG. 4 corresponds to one fiber shown in FIG. 3. There are 864 fibers. The two ends of each fiber are held in position by rigid plates about 2 mm in thickness. A first of the plates with holes located as in FIG. 3 is at the first end of the optical fibers and a second of the plates with holes located as in FIG. 4 is at the second end of the fibers. The fibers are orthogonal to the first and second plates where they pass through the plates, being guided by holes drilled normal to the plane of each plate, and the fibers are suitably bent as they pass between the plates which are about 3 cm apart. In plate 4, a 16×18 array of full colour pixels is realized, yielding a display area of dimensions 6.4 cm×7.2. cm. It will be appreciated by those skilled in the art that the numbers of pixels, numbers of optical modulators, number of tiles, and dimensions of the various components making up the tiles disclosed herein are purely exemplary and are not intended to limit the invention in any way.

Figure 5:
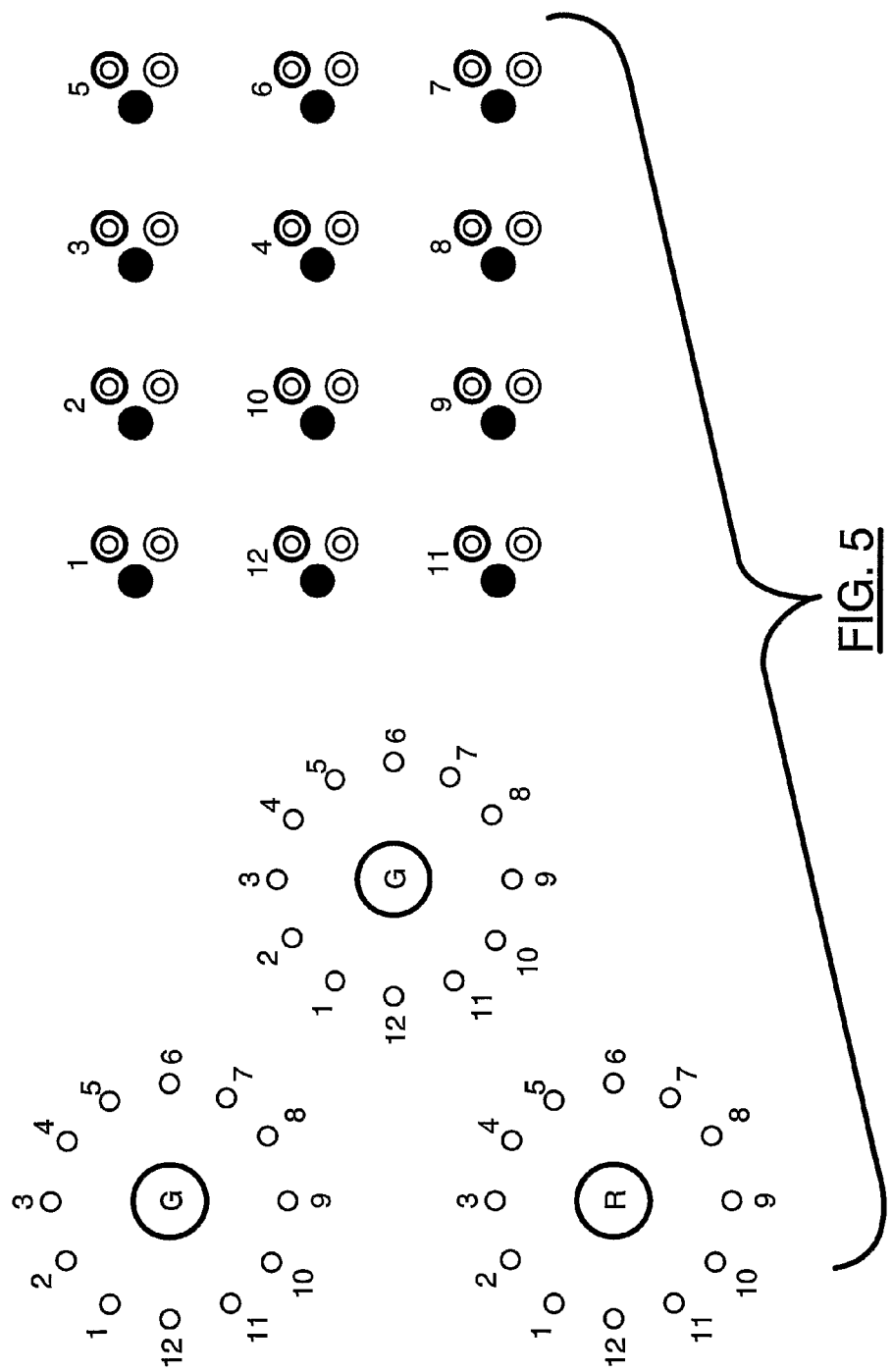
FIG. 5 shows an example of correspondence of holes in the first optical fiber retaining plate of FIG. 3 with the holes in second optical fiber retaining plate. The left side of the Figure shows fiber locations of the first plate, and a right portion showing fiber locations of the second plate. For example, the three (3) fibers that end in the 3 locations of the second plate shown generally at 1 form a triangular pattern, and originate from the three locations, each shown as 1 in the first plate. Of the said three fibers, one is illuminated with green light, one with red and the other with blue.

The correspondence between the holes in the two plates is partially shown, by way of example, in FIG. 5. FIG. 5 has two portions, a left portion showing fiber locations in the first plate, and a right portion showing fiber locations in the second plate. For example, the three (3) fibers that end in the three (3) locations of the second plate shown generally at 1 form a triangular pattern, and originate from the three locations, each shown as numeral 1 in the first plate. Of the three fibers, one is illuminated with green light, one with red and the other with blue.

In the present tiled optical fiber display which uses LEDs to backlight the LC modulator 20, light from modulator 29 is passed through the optical fibres to form the pixels seen by the viewer. This structure permits the number of pixels to be much larger than the number of LEDs.

In the non-limiting tiled optical fiber display example constructed according to the present invention, four (4) full colour pixels are obtained for each LED. This represents a twelve (12) times reduction in LEDs, since twelve (12) full colour pixels require thirty-six (36) LEDs in conventional LED displays. Up to about one hundred (100) pixels can be achieved per LED for high resolution tiled optical fiber displays disclosed herein.

It should be noted that the optical light-guiding components in this invention may consist of optical fibers 34, 34', 34" as described above, however other optical light guides may also be used, such as those made from moulded or extruded, substantially transparent polymers. In addition, the overall light guide may be composed of two or more connected light guide components such as a moulded portion from which light is coupled to a further, extruded component. These various configurations do not alter the inventive concept, but have a bearing on the manufacturing cost of the light guides.

In a conventional LED display, high cost, high current drive electronics are required to turn LEDs on and off. In the present tiled optical fiber display, LED's are not modulated, and only low cost, low power LCD drivers are needed. The present tiled optical fiber displays, unlike other LCD's, are not limited in viewing angle by the LED or the LCD. This is due to the optical design of the display, since optional, optical elements such as diffusers may be placed at viewing plane 40 to control the viewing angle. Viewing angles from small (30°) to large (160°) are possible for the present tiled optical fiber displays. Excellent contrast is achieved due to the black display screen. This is due to the use of a light-absorbing optical fiber retaining plate at viewing plane 40 and the high contrast available from the LCD modulator.

The present tiled optical fiber display system is also very advantageous in that it enables full colour with outstanding colour saturation, long life (~100,000 hours), high efficiency (6 lumens/watt), high brightness (400 cd/m$^2$), excellent contrast (sunlight viewing), shock-resistant screen (not glass), EMI compatible without shielding, pixel pitch from about 2 mm to about 20 mm and a wide range of display sizes including, for example, displays of 10 or 20 feet diagonal.

The present tiled optical fiber display system is applicable to those areas of display technology which currently use LED and projection displays. Projection displays are not flat panels and are therefore restricted to applications that permit space for a screen and projector. Lamp life is limited, and regularly scheduled lamp replacement is necessary. Contrast is only acceptable in low ambient light applications. A summary of key characteristics of LED, projection and technology of the present invention is shown in Table 1.

TABLE 1

| Attribute | LED | Present tiled device | Projection |
|---|---|---|---|
| Size, feet diagonal | 3-50 | 3-20 | 5-50 |
| Resolution | 10-40 mm pixel spacing | 1-20 mm pixel spacing | 1-10 mm |
| Flat | Yes | Yes | No |
| Cost/pixel | $1.00 | $0.0.10 | $0.01 |
| Sunlight-viewable | Yes | Yes | No |
| Life | 100,000 hours | 100,000 hours | 5,000 hours for lamp replacement |
| Brightness | 300 t0 5000 cd/m$^2$ | 300 to 2000 cd/m$^2$ | 100 cd/m2typical |
| Seamlessly tileable* | Yes | Yes | No |

The present tiled optical fiber display system is modular. This means that small blocks (for example 30 cm×30 cm) may be tiled together in a seamless manner to create the required display size. LED displays are also modular, however, projection displays show black lines where they are tiled together. The present tiled optical fiber display system therefore achieves a uniform appearance regardless of the number of modules used, and is therefore suitable for unusual size formats, for example, long, narrow banners (1'×20') for overhead signage or architect-specified custom installations.

Glass-based technologies such as plasma, LCD, EL and CRT are not successful in formats over about 4-8 feet due to their high weight, high cost and fragile nature. These technologies are targeted at TV and smaller, public information displays only. They also suffer from lower operating lifetimes (10,000-60,000 hours) and lower power efficiencies (1-3 lumens/watt) which limits their suitability for high brightness, large size displays.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims.

Therefore what is claimed is:

1. A tiled optical display, comprising:
   at least one display module including
   i) a single liquid crystal display modulator and at least three light emitting diodes positioned to backlight the liquid crystal display modulator, the at least three light emitting diodes including one each of red, green and blue light emitting diodes with a beam of light from each light emitting diode being focused onto a separate one of at least three pre-selected regions of the liquid crystal display modulator spaced from the light emitted by the other light emitting diodes, each pre-selected region of the liquid crystal display modulator including a set of optical modulation elements such that light from each beam of light passes through one set of corresponding optical modulation elements, including a control circuit connected to each individual modulation element of each set of optical modulation elements for controlling a desired amount of light from each beam to pass through each individual optical modulation element of the liquid crystal modulator; and ii) a planar view plane having a pre-selected number of pixels, wherein each pixel is optically coupled to a modulation element in each of said at least three pre-selected regions, each optical fiber having a first end optically coupled to its associated modulation element and a second end optically coupled to its associated pixel, and wherein said first ends of each optical fiber are arranged symmetrically with respect to the beam of light focused onto each pre-selected region of the liquid crystal display modulator so the first ends of said optical fibers in a given pre-selected region of the liquid crystal display modulator is illuminated with substantially the same intensity from the light emitting diode illuminating said given pre-selected region.

2. The tiled optical display according to claim 1 wherein the at least one display module is a plurality of display modules, the planar view plane of each display module being tiled together with a planar view plane of at least one other display module.

3. The tiled optical display according to claim 1 wherein each light emitting diode is positioned sufficiently close to the liquid crystal display modulator so that the light beams from each light emitting diode do not mix with the light beams from any other light emitting diode on the pre-selected region of the liquid crystal display modulator.

* * * * *